(12) United States Patent
Gopalakrishnan et al.

(10) Patent No.: US 9,342,439 B2
(45) Date of Patent: May 17, 2016

(54) COMMAND COVERAGE ANALYZER

(71) Applicant: Synopsys, Inc., Mountain View, CA (US)

(72) Inventors: Chandramouli Gopalakrishnan, Karnataka (IN); Subramanian Chebiyam, Sunnyvale, CA (US); Neeraj Surana, Karnataka (IN); Santosh Kulkarni, Karnataka (IN); Rohit Kapur, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/737,392

(22) Filed: Jun. 11, 2015

(65) Prior Publication Data

US 2015/0363295 A1     Dec. 17, 2015

Related U.S. Application Data

(60) Provisional application No. 62/011,555, filed on Jun. 12, 2014.

(51) Int. Cl.
*G06F 9/44*    (2006.01)
*G06F 11/36*   (2006.01)

(52) U.S. Cl.
CPC ........ *G06F 11/3676* (2013.01); *G06F 11/3616* (2013.01); *G06F 11/3684* (2013.01); *G06F 11/3692* (2013.01)

(58) Field of Classification Search
CPC .................................................. G06F 11/3676
See application file for complete search history.

(56) References Cited

U.S. PATENT DOCUMENTS

| | | | |
|---|---|---|---|
| 6,718,521 B1 * | 4/2004 | Bentlage | G06F 17/5022 716/106 |
| 2004/0025088 A1 * | 2/2004 | Avvari | G06F 11/3676 714/38.13 |
| 2004/0128584 A1 * | 7/2004 | Mandava | G06F 11/3676 714/38.14 |
| 2008/0282235 A1 * | 11/2008 | Jadhav | G06F 11/3676 717/131 |

* cited by examiner

*Primary Examiner* — Philip Wang
(74) *Attorney, Agent, or Firm* — HIPLegal LLP; Judith A. Szepesi (57) ABSTRACT

A method and apparatus of a novel command coverage analyzer is disclosed. Combinations of commands, options, arguments, and values of a product are extracted, customer environment and uses are considered, and a more comprehensive and accurate quality of software process and metric is provided.

20 Claims, 9 Drawing Sheets

COMMAND COVERAGE ANALYZER

RELATED APPLICATIONS

The present application claims priority to U.S. Provisional Application No. 62/011,555 filed on Jun. 12, 2014, and incorporates that application in its entirety.

FIELD

The present invention relates to software product testing and in particular to dynamic and other methods related to testing complex software.

BACKGROUND

Software testing takes time, and is a necessary element of the software development process. The quality of a software product is typically measured in terms of how well it is tested by a test suite and how few problems or bugs (unintended behavior of software) are found after release.

There are different types of testing methods available to determine software quality by applying a test suite to a software product. Test suites are pre-defined groups of tests designed to make sure certain aspects of a software product are tested. Various groups might define test suites for different purposes, for example, one or more of a customer, research and development engineer, or coder may develop a test suite for software.

One measure of software quality, called line coverage, measures the percentage of the code within the software product that is executed and tested through the associated test suite. For example, 10% line coverage means that 10% of the lines of code that make up the software product are executed when applying the test suite. Conversely, 90% of the lines of code that make up the software product are not executed when applying the test suite when the line coverage is 10% A similar metric of software quality, called functional coverage, measures the percentage of functions and/or subroutines that are executed and tested through the associated test suite. For example, 20% function coverage means that 20% of the functions present in the software have been called from at least one test in the test suite. These and similar metrics provide some basis for software code, but fail to give a full picture of behavior of the product. Whether or not a function is called does not indicate whether it was called correctly and whether or not it functioned correctly when called. Similarly, it does not give insight into whether or not variations in the call of the function impact software product quality.

Another type of testing method, called black box testing, measures the quality of software by testing the product behavior based on a requirements document and assuming no knowledge of the code of the software product. However, black box testing is time consuming. For black box testing and other similar metrics, it is nearly impossible to ensure that all updates and scenarios are tested. And, similarly to the above metrics, does not give insight into whether or not variations of the inputs will impact software product quality.

Despite of all the quality tools being used extensively during the software product development phase, production software (a software product that has been released) ends up with many bugs. These bugs result in additional technical support required for the software product, redevelopment iterations to correct the software product, and increased costs associated with software product development. Additionally, software product updates may introduce additional bugs. These additional bugs may occur at various product events, such as when a product is changed, for example, with a new version or release; between phases of product development such as alpha release, beta release, and gold release. Additional bugs may be introduced when changes are made to portions of the software product, for example, when changes are checked-in to a code management system, or associated with a validation schedule, for example weekly or at a milestone. Therefore, product development that may introduce bugs into the product code may happen in a variety of stages, both pre- and post-release of the software.

In addition to the bugs that may be introduced despite adherence to a rigorous software product development and quality assurance process, the reality of compressed development and software product update schedules associated with modern software development may require a timeframe that results in skipping many steps of a quality assurance process. For example, software products may be developed or updated by someone other than the standard product and development team. For example, updates may be coded by research and development teams creating functionality or fixing complex bugs and then released to a customer under a tight time frame that allows minimal formal, if any, testing. As another example, multiple features may be added to a software product in parallel on a schedule that does not allow complete testing for compatibility and interaction between those multiple features before release. Different features may be implemented by different groups in diverse locations and time zones, impairing the ability of teams working on the same software product to align on development. The likelihood of even more bugs introduced into the software is increased when not following best practices in software product development.

Despite the relative maturity of the software industry, with decades of software testing using these methodologies, software quality issues persist, costing time and money when problems are exposed after release. Metrics similar to line coverage, functional coverage, and black box testing are not producing bug-free or bug-minimized releases. Additionally, existing metrics do not measures issues associated with customer usage. Customer issues are found when a software product is shipped to a customer and the customer finds a bug in the software. It would be desirable to have a quality metric that includes customer usage issues in the metrics for software quality testing, to proactively minimize bugs.

In spite of long-felt need for a more robust testing environment, both in a robust development process or an abbreviated one, at this time there has not been a systemic approach to ensuring that testing truly covers so many of the scenarios likely encountered by the customer or end-user in production and other software products.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Software may be complex for a variety of reasons. For example, in many types of Electronic Design Automation (EDA) software, the software products not only perform extremely complicated functions, but also allow a wide variety of customization within those complicated functions. In addition, the EDA software products may interact with external elements such as other software products or libraries of elements, each having additional options for customization available to the end-user. Depending on the software product, customization may be allowed via commands such as via a command line or interactive instructions; options such as simplification macros, tuning parameters, and characteristic definitions; arguments such as size, standard cell type, orientation, characteristics; and values such as resistance and power use. A set of one or more of commands, options, arguments, inputs, operations, values and other similar variables applicable to the product under test may be referred to as "configurations." Other names and examples of these operational and characteristic variables may be used depending on the type and function of the software product.

The conditional command coverage analyzer (CCA) is a tool with an associated system and method that provide, among other things, a conditional coverage metric for software quality. The CCA adapted software development process greatly reduces time to bug identification, allowing proactive software improvement before software product release. The CCA may additionally extract configurations of a software product, produces permutations and combinations of these configurations, and determines whether a test suite covers those permutations and combinations of configurations. In one embodiment, a system performs run-time aware, fully automated data mining techniques to extract the relevant configurations. In one embodiment, the system additionally takes as input the customer environment where the CCA may be deployed. Therefore, the CCA may include additional configurations related to other contexts, such as a customer environment, when producing permutations and combinations of configurations.

Including additional contexts in the permutations and combinations of configurations enable the CCA to adapt to the rapidly changing development environment, for example, when dealing with a heavily abbreviated timeframe for development, and results in a higher quality metric and associated software quality. The subset of configurations may change frequently during development, and the CCA may adapt to address those changes quickly and easily.

Ideally, coverage is measured regularly to ensure both that the test suite is complete enough that appropriate permutations and combinations of configurations are tested and also that the right conditional scenarios are tested. As more of the software code is covered by the tests within test suites, the higher the conditional command coverage of the software code. Having high conditional command coverage reduces unexpected software behavior at customer sites and increases overall confidence in the product. Conditional command coverage is the percentage of configurations that are executed by the test suite. Test suites also may be based on real scenarios that simulate the customer or user environment in which the software code is executed or run. Failing to track conditional command coverage in a proactive fashion leads to increased iterative bug fixing and additional re-development phases, which eventually impacts the time to market and increases the overall project/product budgets.

Figure 1:
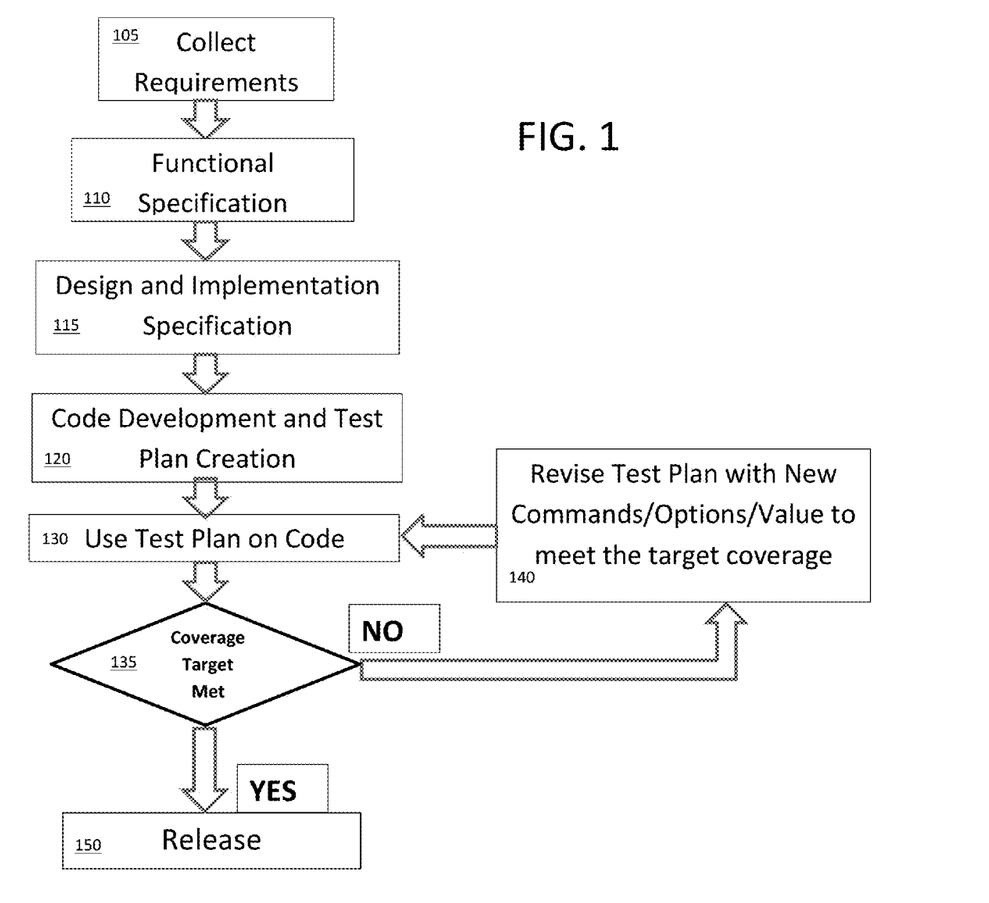
FIG. 1 is a flowchart of one embodiment of a common software development lifecycle.

FIG. 1 is a flowchart of one embodiment of software development lifecycle in accordance with the present invention. A software project, such as a new version of a product release, begins with the requirements needed to define the scope of resulting software (Block 105). Those requirements are documented into a requirements or functional specification (Block 110) that defines the functions that the resulting software needs to perform. This functional specification may be reviewed and approved by, for example, one or more of the software architect, the project manager, the coding engineer, and an end-user. It is obvious that others may be involved in the review cycle.

A design document or specification (Block 115) is drafted to define the design of the resulting software and is provided to the implementation team. The implementation team uses the design specification to implement the functions through software coding (Block 120). Concurrently or serially, a Test Plan is drafted based on the scope of the software project (Block 120). For example, a research and development team may collaborate with a testing support team to draft a test plan. In one embodiment, one or more of a unit test plan, a system test plan, an extensive test plan and a black box test plan are defined based on the budget of the software project.

When the code is sufficiently developed or coded to the point that testing makes sense, the sequence of tests as defined by the Test Plan is applied to the code (Block 130). If the desired testing coverage is met (Block 135), then the software project is sufficiently designed and tested and may be released (Block 150). However, if the desired testing coverage is not met (Block 135), then the Test Plan is revised to include testing to meet the desired testing coverage (Block 140). This Revised Test Plan may then be applied to the code (Block 130), and the desired testing coverage reevaluated (Block 135). This process may be iterated, until the software passes the test.

Figure 2:
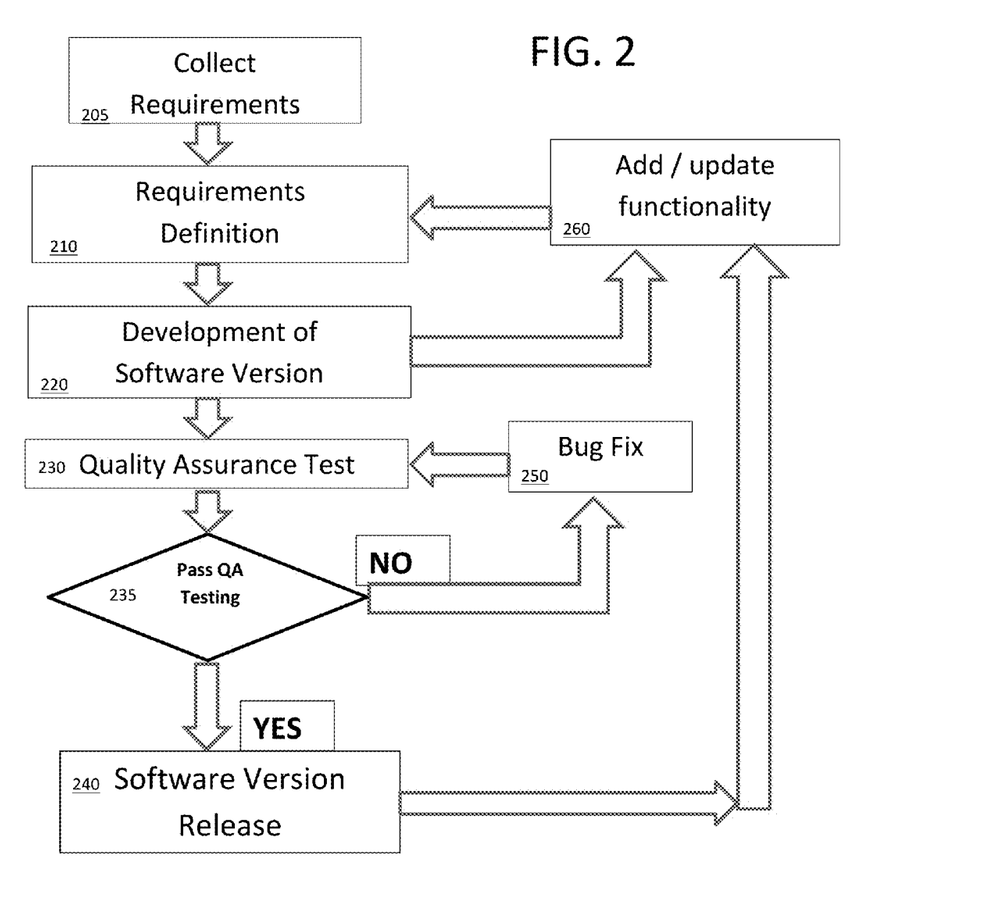
FIG. 2 is a flowchart of one embodiment of a common software development lifecycle including development of additional versions of a product.

FIG. 2 is a flowchart of one embodiment of a common software development lifecycle including development of additional versions of a product. Requirements for the software version are collected (Block 205) and formalized into a specification (Block 210). The software version is developed from the specification (Block 220). Testing is performed (Block 230). In one embodiment, testing is also referred to as Quality Assurance (QA). Testing is used to verify the software functionality. If the software does not pass QA testing, the problems or bugs are fixed (Block 250) and the resulting updated software version, in part or in whole, is QA tested again (Block 230). If the software version passes QA testing, then the software version may be released (Block 240).

Additional software versions may be developed from the software version code base. For example, adding or updating functionality (Block 260) results in additional requirements definition (Block 210) which is used to develop an updated software version (Block 220).

Code coverage testing generally tests whether each portion of code is actually utilized. However, traditionally code segments that have a variety of configurations, such as a situation where a code segment includes multiple possible outcomes, or accepts multiple possible options, arguments, and/or values, any single pass through the code with a single configuration would be considered sufficient for that code to be considered covered. However, this traditional view of coverage may result in a code coverage test that has an error for certain combinations of values that were not tested. As a result, traditional code coverage analysis has a certain randomness to the result—where the configuration tested determines the pass/fail of the test. In contrast, the CCA in a similar situation will identify the multiple possible outcomes or the multiple possible options, arguments and/or values and incorporate permutations and combinations of those configurations into the test suite. Accordingly, when the CCA shows that code to be covered by a test suite, it is clear that the variations that may be associated with that code are tested.

Figure 3:
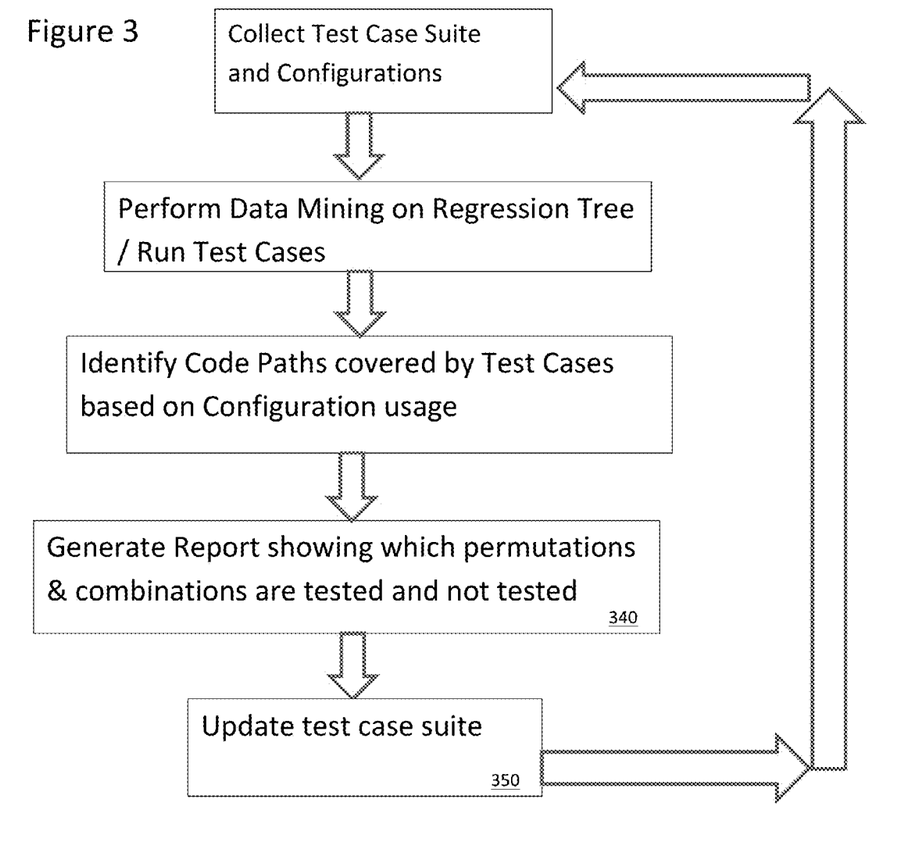
FIG. 3 is a flowchart of an exemplary prior art testing approach, using code coverage.

FIG. 3 illustrates an exemplary flowchart for one embodiment of code coverage analysis. Once a software project, such as a feature or routine, is completed or otherwise ready for testing, such as an initial or updated iteration or version, code coverage analysis may begin. The test suite and a list of configurations is obtained (Block 310). Data mining is performed to determine permutations and combinations of configurations usage as well as determine what code in the software project is covered by the test suite (Block 320). Test cases are run based on the data mining (Block 320). In one embodiment, test cases in step 310 are automatically generated from this information.

Code paths and configurations that were tested by the test cases are identified (block 330). The system then generates a report of code paths and configurations that were tested and were not tested (Block 340). In one embodiment, partially tested code paths and permutations and combinations of configurations may be identified by this process. This information may be used to improve the test suite (Block 350) and obtain an updated test suite and an updated list of configurations (Block 310) to reapply the testing to the software project (Block 320).

Figure 4:
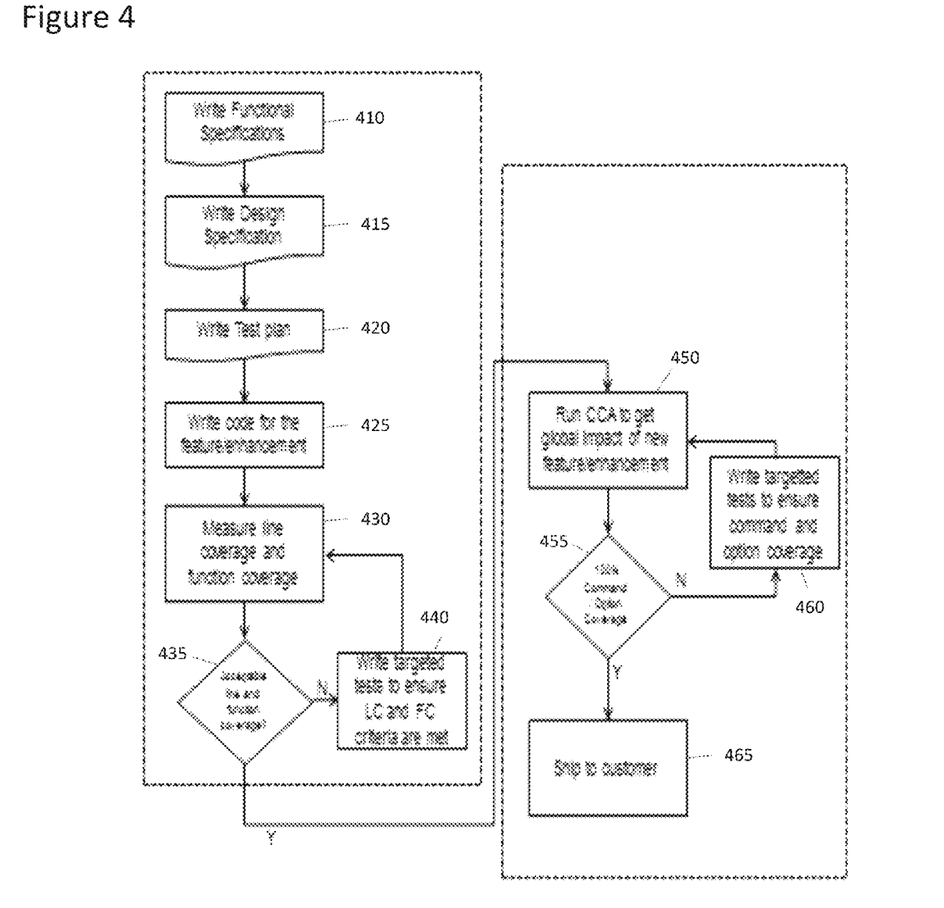
FIG. 4 is an overview flowchart of one embodiment of command coverage analysis.

FIG. 4 is an overview flowchart of one embodiment of command coverage analysis usage as a complement to a software development process. In one embodiment, specifications are written, first the functional specification (Block 410) and then a design specification (Block 415). In one embodiment, a test plan is written (Block 420). Code is then developed (Block 425) based on those specifications. The code may be developed by large teams and disparate groups. Tests in the test suite are performed (Block 430). The tests, in one embodiment, include line coverage and function coverage.

The system evaluates whether the coverage is adequate (Block 435). If the coverage is not adequate, more targeted tests are added (Block 440), and the process returns to block 430, to perform the initial tests. In one embodiment, targeted tests are created by the command coverage analyzer (CCA).

If the coverage is adequate, the process continues to one embodiment of the (CCA). After the line and function coverage are achieved, CCA is run to get the command coverage (Block 450). The process determines whether the command coverage is adequate (Block 455). In one embodiment, command coverage is considered adequate when it is 100%. In one embodiment, this means that is every permutation and combination of configurations is tested, where those configurations include environmental considerations for all relevant environment, such as customer site-specific information. When 100% adequacy is required, then no untested scenarios should be encountered at a relevant customer site. In another embodiment 90% coverage may be considered sufficient to ship the product. In another embodiment, a particular subset of configurations with a different coverage percentage may be considered sufficient to ship the product. In one embodiment, scenarios associated with default configurations of the software product under test, such as default options for commands, require a first level of adequacy and specialty scenarios used by only highly sophisticated users of the software product under test require a second level of adequacy.

If the command coverage is not adequate, as determined at Block 455, more test cases are added to enhance command coverage (Block 460). If the command coverage is adequate, the testing is considered complete (Block 465), and the code may be ready to ship, or ready for the next phase in the software development process.

One of ordinary skill in the art will recognize that the process described is a conceptual representation of the operations used to implement command coverage analysis. The specific operations of the process may not be performed in the exact order shown and described. For example and in one embodiment, the process sets up the test plan after the code is written. The specific operations may not be performed in one continuous series of operations, and different specific operations may be performed in different embodiments.

Figure 5:
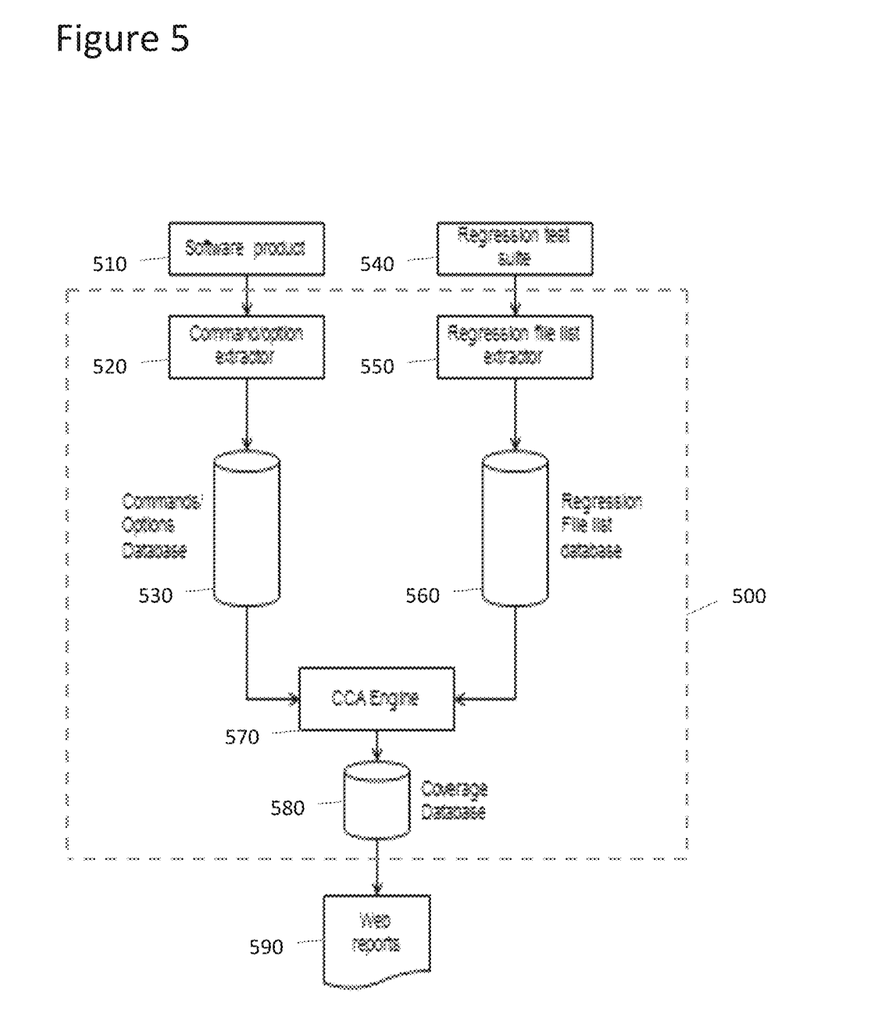
FIG. 5 is a block diagram of one embodiment of creating a command coverage web report

FIG. 5 is a block diagram of one embodiment of creating a command coverage web report. The software product 510 is used as an input to a configuration extractor 520. In one embodiment, configuration extractor 520 forms the keys to a hash table data structure, which is created to keep track of occurrences of the software product configurations. In another embodiment, a tree structure is used, or a different type of data structure.

In one embodiment, the configurations are used within EDA software to design integrated circuits. The configurations may specify, by way of example, a command to instantiate an input/output block, an option utilize an input/output block of a particular type and values equivalent to the number of inputs and the number of outputs of the input/output block. In this example, while a designer of the integrated circuit may choose to enable 4 of 8 possible inputs and 5 of 8 possible outputs, a typical test suite for such software will only test the maximum number of inputs and outputs. In such a situation, the typical test for that input/output block will not have tested a future user's configuration. By keeping track of occurrences of the EDA product configurations and determining permutations and combinations of those configurations, CCA applied to this example EDA product both identifies these types of situations as uncovered and provides a mechanism to test these situations before shipping software to prevent issues during customer usage after the product has shipped.

For example, in an EDA product supporting design for test (DFT), a command such as "set_streaming_compression_configuration—dft_architecture open_core" (hereinafter "Command 1") means that if logic associated with a DFT software product is inserted into a design representing a portion of an integrated circuit, then all additional associated information to the logic need also be inserted into or associated with that portion of an integrated circuit. For example, the logic present in the form of scan chains need to be connected to the interface of the core. For this example, the Command 1 represents only input instruction to the DFT software product under test. Therefore, the way the product may be tested is to validate the resultant logic, in this case the final netlist connections resulting from the command. In one embodiment, while the ultimate user design created by the software product under test is not accessible for test of the software product, structures that the software product under test may insert into that design are testable and permutations and combinations of the connections of those structures may be tested with the CCA.

As another example, input and output ports created in a design representing a portion of an integrated circuit may vary greatly. For example, for an option specifying the number of scan mode chains in the core as 1, the corresponding input/output port created in the core interface may be 6. For an option specifying the number of scan mode chains in the core as 2, the input/output port count created in the core interface may be 12 or it may be 4, based on another option specifying a DFT_architecture value (e.g. a dual input/dual output option choice).

By testing numerous permutations and combinations configurations, such as various commands, options, arguments, and values, and validating the resultant architecture, desired coverage can be met and quality of the software product under test can be assured. For EDA software products, similar scenarios are applicable for any commands, options, arguments, and values combination.

Configuration extractor 520 provides an output, configurations extracted from the software product under test, which is stored in a database 530 or other storage medium.

Similarly, the test suite and test infrastructure information 540 are passed to a file list extractor 550, in one embodiment. File list extractor 550, in one embodiment, uses a Tcl Parser to parse through the existing test suite. It is obvious that any suitable parser or other appropriate analytical tool may be substituted that can parse the test suite. The results of this parse are stored in file list database 560, representing the configuration combinations that are present in each test case within the test suite.

In one embodiment, software products under test are associated with a dedicated disk space maintained by a software release engineering team. In one embodiment, the release engineering team runs the test suite on the software product code base using a set of instructions from a research and development (R&D) team. The R&D team uses test suites to validate code coverage quality, and determine whether it is declining due to the various code changes made to the software product code base. Unfortunately, this alone does not guarantee software quality. Therefore, file list extractor 550 is provided the test suites as input and, using the parser algorithm, uses data mining on the test suite to identify each permutation and combination of configurations tested. This data mining eventually provides the data stored in 560 that will provide guidance to the CCA engine 570 to determine the missing combinations of commands, options, arguments, and values for the tested product.

The configuration database 530 and regression file list database 560 are passed to the CCA engine 570. The CCA engine 570 takes these two inputs, and analyzes the overlap between the available permutations and combinations of configurations, such as commands, options, arguments, and values, and the tested set of configurations, such as commands, options, arguments, and values, from the test suite. The CCA engine 570 then generates a command coverage database 580.

In one embodiment, the CCA engine 570 also generates a report the coverage of global variables. These variables have been the bane of many of a product in the software industry. During times when a critical patch has to be released to a customer, or to gain more debug data, developers introduce global variables. These variables, when set in the input script, either modify functionality or give more debug data. Typically, these variables do not fall under a test plan and so functionality of the software product code with these variables activated is not fully tested. In one embodiment, CCA engine 570 can give coverage statistics on these global variables. In one embodiment, CCA engine 570 reports on how many of these global variables are tested in the regression test suite.

In one embodiment, after parsing an entire test suite, a sequential scan of the coverage database, in one example a hash table, provides the command coverage statistics of the software product under test. From command coverage database 580, command coverage reports 590 are generated. In one embodiment, the command coverage reports 590 are web enabled. In one embodiment, the coverage reports 590 provide design scripts for untested product configurations. This enables the development team to use the design script to update the test suite and to provide coverage for the non-tested configurations. The test suite, as adjusted by these scripts, can then be used in future runs to perform continuous validation. In one embodiment, each time the software product is updated, this test should be run. In one embodiment, the preferred set-up is to run the CCA on a daily, weekly, or per check-in basis. This ensures that lack of testing coverage is quickly discovered and remedied.

Figure 6:
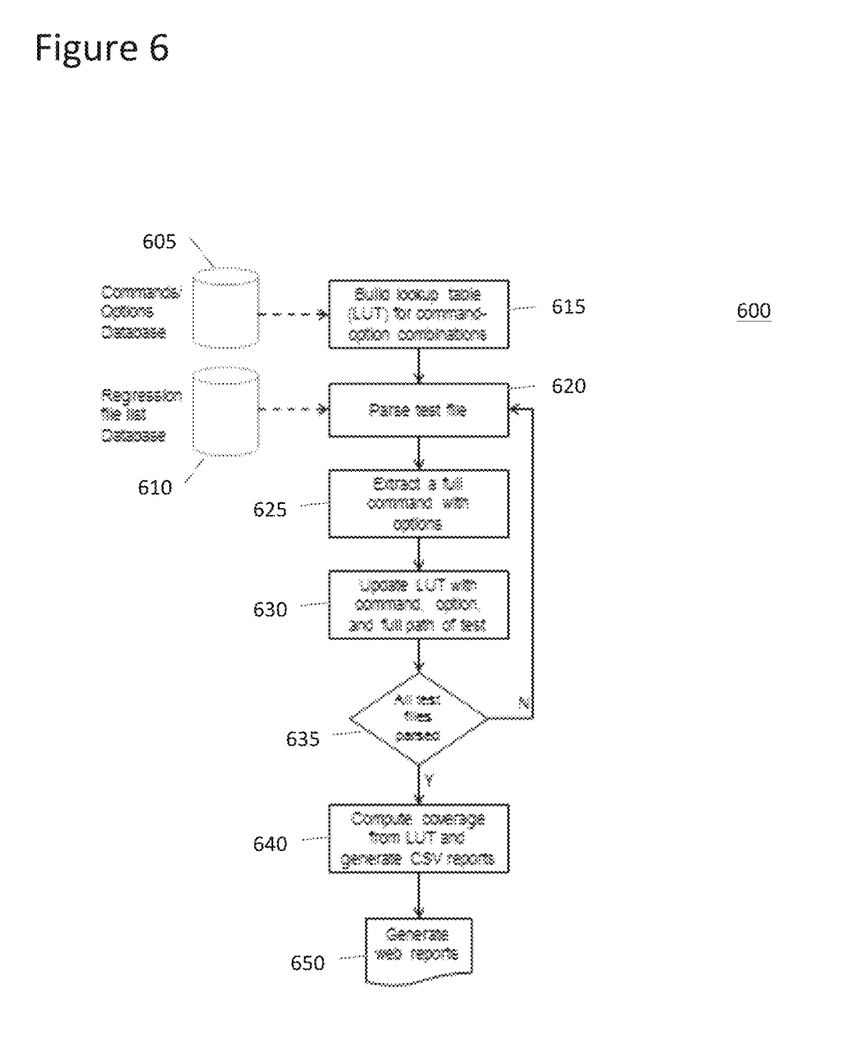
FIG. 6 is a flowchart of one embodiment of the command coverage analyzer (CCA).

FIG. 6 is a flowchart of one embodiment of a CCA process 600. In one embodiment, CCA process 600 is a dynamic code analysis process. CCA process 600 receives input from both a configuration database 605 and a test suite database 610. Information about configurations of a software product under test from configuration database of block 605 are extracted. In one embodiment, a look up table (LUT) (Block 615) is created from this information, including the commands, options, arguments, and values that may be present in the software product under test. Other embodiments may use other mechanisms to store and interrelate this information, such as a graph, hash table, or tree. In one embodiment, a LUT or other storage mechanism may store a "golden log" of results from test cases that have been firm to be correct, wrong, or other status of interest. Information about test suites for the software product under test is parsed from test suite database 610 in Block 620 to extract a full set of tested configurations commands, options, arguments, and values list (Block 625). For each test in the test suite within test suite database 610, the parser infrastructure of Block 620 determines the configurations tested in that file (Block 625). In one embodiment, the parser infrastructure is a Tcl parser.

In one embodiment, configurations extracted from each test file in test suite database 610 are used to update (Block 630) the file, e.g. a LUT, created in Block 615. In one embodiment, the file updated is a golden log. In one embodiment, a file name and path for each configuration is also stored to enable cross referencing. CCA process 600 determines whether all test files have been parsed in Block 635, and if not, CCA process 600 returns to block 620, to parse the next test file in the test suite. Once all the files are parsed, CCA process 600 continues.

When all test files have been parsed in Block 635, post processing (Block 640) on the file generates a coverage. In one embodiment, a current set of results for a test suite applied to the software product under test are compared to a "golden" set of results to a prior test suite on that software, and each of the current test results are identified positively, concerning, or negatively based on the comparison. For example, if a golden set of results to a prior test suite has been reviewed and each determined as a correct, concerning, or negative results to a test case in a test suite, then the current set of results may be compared to the golden set of results, each current test case receiving the same results as a corresponding test case in the golden set of results additionally receiving the same determination as that test case in the golden set of results. In this manner, test cases with unchanged results over time require no further review. If a current test case is not present in the test suite for the golden set of results, then the test case may be marked as concerning, or other designation, to note that the results of that test case need to be validated or otherwise annotated to be added to an updated golden set of results for future comparison. In one embodiment, a portion of CCA process 600 may be used for a coder, R&D engineer or other interested party to test a portion of the code to proactively create an updated golden set of results. In one embodiment, a golden log may be part of CCA process 600 associated with information from configuration database 605 and test suite database 610. In one embodiment, a golden log may be additionally associated with the update in Block 630.

In one embodiment, one or more test cases may be suggested for inclusion in a future test suite or version of the test suite based on coverage results. For example, identification of commands that are uncovered may then generate a new test case with one or more uncovered commands and add it to the test suite. In this situation, the new test case will receive a determination appropriate to identify it as a test case that needs validation of the results.

In one embodiment, the resulting reports are in CSV form. In one embodiment, the resulting reports are in XML form. Reports, in one embodiment, are made available on an internal or external web (Block 650). CCA process 600 then ends.

One of ordinary skill in the art will recognize that the process described is a conceptual representation of the operations used to implement command coverage analysis. The specific operations of the process may not be performed in the exact order shown and described. For example and in one embodiment, the process system first parses the test file and extracts the configurations and uses the LUT or other from the testing suite to update with the data from the software. Furthermore, the specific operations may not be performed in one continuous series of operations, and different specific operations may be performed in different embodiments.

Figure 7:
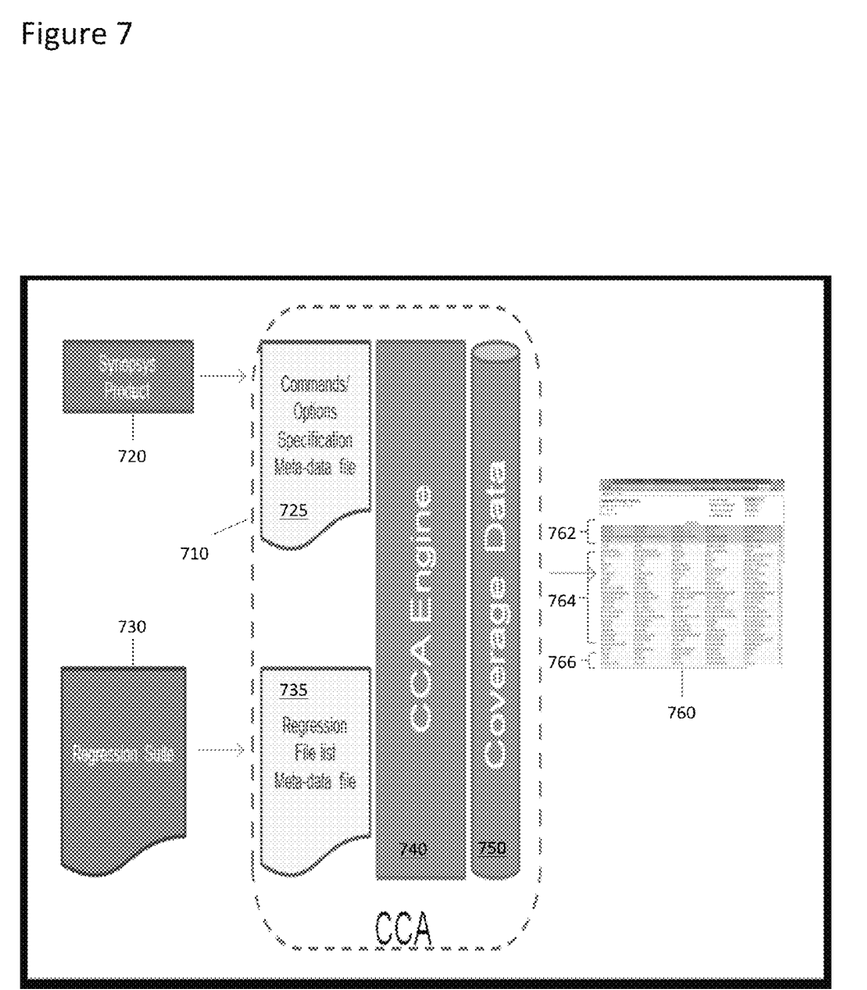
FIG. 7 is a block diagram of one embodiment of the architecture of the CCA.
Figure 8:
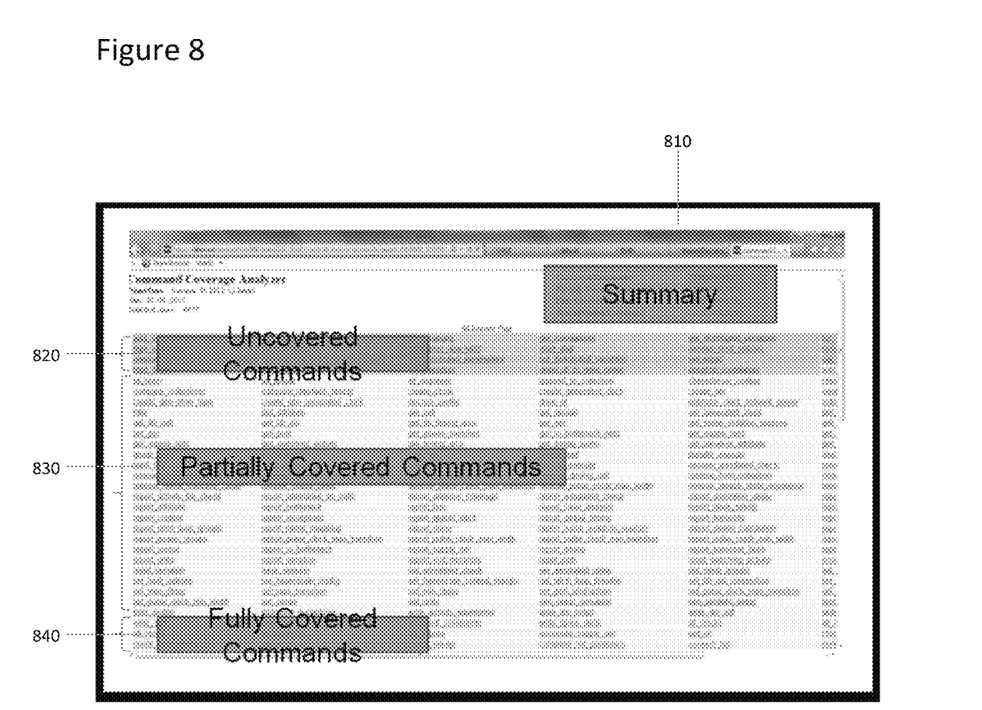
FIG. 8 an exemplary output of the CCA.

FIG. 7 is a block diagram of one embodiment of a CCA architecture. CCA 710 takes as inputs a software product under test 720 and any existing test suites 730. CCA 710 extracts configurations, such as commands, options, arguments, and values from software product under test 720. In one embodiment, the extracted information is stored as a specification meta-data file 725 representing the configurations available or possible in software product under test 720. CCA 710 extracts information from an existing test suite 730, if any is available, and stores the extracted information as a file list meta-data file 735 representing the various permutations and combinations of configurations that are presently represented by existing test suite 730. In one embodiment, environments such as Tcl shell based products, have automated ways that configuration information can be extracted from a set of test suites into file-list meta-data file 735. In another embodiment, such as when automation is not possible, the meta-data file may be created manually. In one embodiment, one or more additional meta-data files are included within CCA 710. In one embodiment, additional configurations may be added into specification meta-data file 725 or file list meta-data file 735 within CCA 710. In one embodiment, additional meta-data includes information to include or exclude when reporting. In one embodiment, the information comprises a set of commands to exclude.

In one embodiment, CCA engine 740 performs parsing of the selected meta-data files, e.g. specification meta-data file 725 and file list meta-data file 735, and updates an internal coverage database 750. In one embodiment, CCA engine 740 creates permutations and combinations of information within specification meta-data file 725 and correlating those with elements of file list meta-data file 735. In one embodiment, CCA engine 74-reviews change information from specification meta-data file 725 and correlates only the changed information with file list meta-data file 735, updating only differences into internal coverage database 750. In one embodiment, CCA engine 740 excludes excluded commands from permutations and combinations of information within specification meta-data file 725. Upon completion of the CCA engine 740 operation, a report 760 is generated to identify the testing gaps based on the set of configurations. In one embodiment, configurations in first region 762 are uncovered commands, second region 764 are partially covered commands, and third region 766 are fully covered commands. An exemplary report format for report 760 is shown in FIG. 8.

FIG. 8 an exemplary output of the CCA in accordance with one embodiment of the present invention. A summary region 810 is provided for quick access to key information at-a-glance, such as summary metrics and high-level statistics. Summary region 810, in one embodiment, gives a count for each of the number of uncovered commands (commands which are not represented any test in the test suite), partially covered commands (commands which are represented by one or more tests in the test suite, but not all configurations of the command are represented by a test in the test suite), and fully covered commands (commands for which there are at least one test in the test suite for each of the possible configurations of that command). Other representations of similar information are possible. For example, a percentage may be shown rather than a count, or a subset of command statistics may be shown. Additional summary information may be available in summary region 810 for different software products, and different types of information of interest may be shown in summary region 810. For example, the number or percentage of options that have tests may be displayed, or the number of percentage of arguments that have coverage.

First region 820 displays, in one embodiment, the commands in the software product that are uncovered, second region 830 displays commands that are partially covered, and third region 840 displays those commands that are fully covered. In one embodiment, each command is associated with additional information pertaining to one or more of quality assurance, associated tests in the test suite, configuration possibilities, or the state of the coverage. In one embodiment, each command is a hyperlink that leads to a list providing tests within the test suite covering that command. In one embodiment, information throughout the report is hyperlinked. For example, commands may be coupled by hyperlinks to code segments of relevance, information from the code management system on the author, dates coded, or other relevant information to the relevant code, errors or other information returned when executing the test suite, and a history of tests run on those commands including a next most recent test suite applied to the software product under test.

In one embodiment, summary regions 820, 830 and 840 show results of test cases in the test suite, for example, summary region 820 may identify test cases in the test suite that crash the software under test, summary region 830 may identify test cases in the test suite that return with an error, and summary region 840 may identify test cases in the test suite that return with information as expected. Additional summary regions may identify additional information, such as a summary region similar to 820, 830 and 840 that identifies test cases that return without error, but indicate that something isn't wholly correct in the function of the software under test.

In one embodiment, summary regions identify prospective effects of code intended for pruning. For example, how restriction of a set of options for a set of commands affects test cases within a test suite. When test cases are associated with other characteristics or information, such as which users have been interested in results from those test cases, this may also indicate which users will be affected by the intended pruning.

In one embodiment, static analysis tools may use techniques and tools described herein to facilitate development of static analysis checkers. For example, a function called with a variable may not be evaluated in a traditional static analysis tool, as the definition of that variable is usually resolved during the compile or linking process.

As is obvious to one skilled in the art, these concepts may be extended to all of the embodiments and examples disclosed herein.

The simplicity of the system and method of CCA analysis leads to a very efficient implementation and function. For example, detailed reports similar to the exemplary output of the CCA in FIG. 8 for a very complex software product, such as the EDA ICC tool, with an associated test suite containing 64,000 test cases took about 3 minutes to generate. Less complex software products, such the EDA DFTMAX Ultra tool, may take less than one minute to generate detailed reports similar to the example in FIG. 8.

The CCA is designed to be quite simple, and when used on a regular basis, should not only reduce cycle time and bug fixing within the design cycle, but also reduce the number of bugs and configuration issues that reach the end-user. Additionally, by providing testing coverage analysis, the CCA enforces better testing procedures even when applied in an abbreviated software quality process. Although many examples of complex software used are in the EDA space, the CCA may be applied to any software product, regardless of language, platform, or complexity. For example, other types of software products with a constrained set of commands, options, arguments, and values may be similarly set up for testing. However, is the CCA is especially beneficial to complex software products with large numbers of configurations but that constrain the range of some or all of the configurations, such as EDA, because small changes made to the software product code can significantly change those available set of configurations and therefore introduce a wide variety of bugs into existing tested code.

Figure 9:
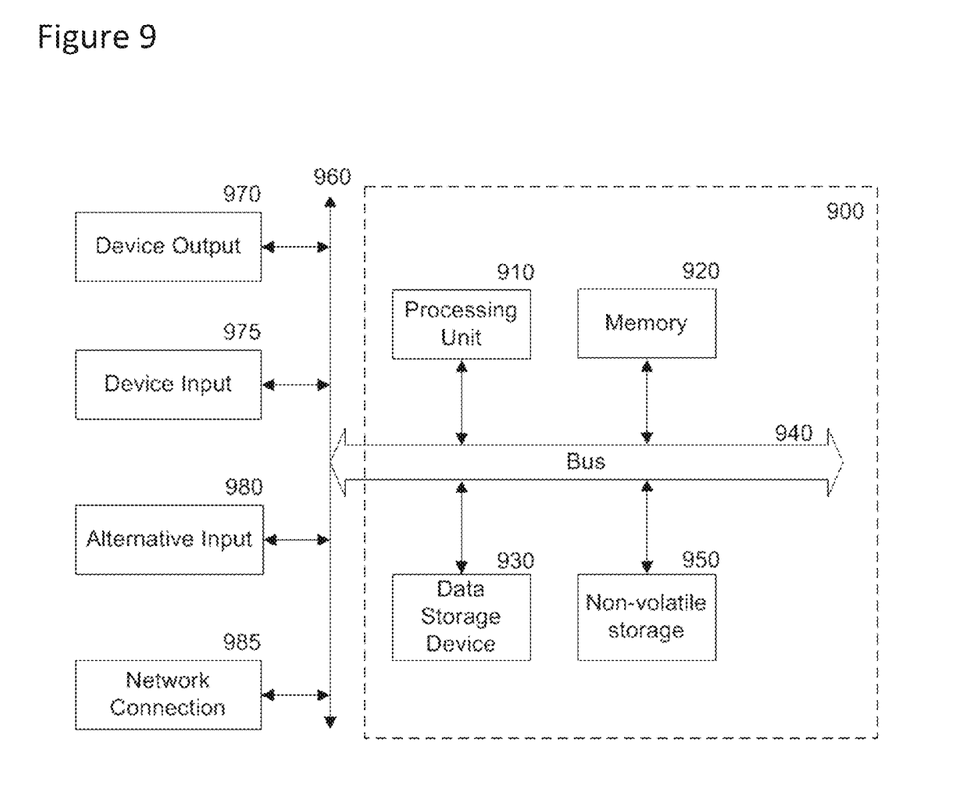
FIG. 9 is a block diagram of one embodiment of a computer system that may be used with the present invention.

FIG. 9 is a block diagram of a particular machine that may be used with the present invention. It will be apparent to those of ordinary skill in the art, however that other alternative systems of various system architectures may also be used.

The data processing system illustrated in FIG. 9 includes a bus or other internal communication means 940 for communicating information, and a processing unit 910 coupled to the bus 940 for processing information. The processing unit 910 may be a central processing unit (CPU), a digital signal processor (DSP), or another type of processing unit 910.

The system further includes, in one embodiment, a random access memory (RAM) or other volatile storage device 920 (referred to as memory), coupled to bus 940 for storing information and instructions to be executed by processor 910. Main memory 920 may also be used for storing temporary variables or other intermediate information during execution of instructions by processing unit 910.

The system also comprises in one embodiment a read only memory (ROM) 950 and/or static storage device 950 coupled to bus 940 for storing static information and instructions for processor 910. In one embodiment, the system also includes a data storage device 930 such as a magnetic disk or optical disk and its corresponding disk drive, or Flash memory or other storage which is capable of storing data when no power is supplied to the system. Data storage device 930 in one embodiment is coupled to bus 940 for storing information and instructions.

The system may further be coupled to an output device 970, such as a cathode ray tube (CRT) or a liquid crystal display (LCD) coupled to bus 940 through bus 960 for outputting information. The output device 970 may be a visual output device, an audio output device, and/or tactile output device (e.g. vibrations, etc.)

An input device 975 may be coupled to the bus 960. The input device 975 may be an alphanumeric input device, such as a keyboard including alphanumeric and other keys, for enabling a user to communicate information and configuration selections to processing unit 910. An additional user input device 980 may further be included. One such user input device 980 is cursor control device 980, such as a mouse, a trackball, stylus, cursor direction keys, or touch screen, may be coupled to bus 940 through bus 960 for communicating direction information and configuration selections to processing unit 910, and for controlling movement on display device 970.

Another device, which may optionally be coupled to computer system 900, is a network device 985 for accessing other nodes of a distributed system via a network. The communication device 985 may include any of a number of commercially available networking peripheral devices such as those used for coupling to an Ethernet, token ring, Internet, or wide area network, personal area network, wireless network or other method of accessing other devices. The communication device 985 may further be a null-modem connection, or any other mechanism that provides connectivity between the computer system 900 and the outside world.

Note that any or all of the components of this system illustrated in FIG. 9 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 920, mass storage device 930, or other storage medium locally or remotely accessible to processor 910.

It will be apparent to those of ordinary skill in the art that the system, method, and process described herein can be implemented as software stored in main memory 920 or read only memory 950 and executed by processor 910. This control logic or software may also be resident on an article of manufacture comprising a computer readable medium having computer readable program code embodied therein and being readable by the mass storage device 930 and for causing the processor 910 to operate in accordance with the methods and teachings herein.

The present invention may also be embodied in a handheld or portable device containing a subset of the computer hardware components described above. For example, the handheld device may be configured to contain only the bus 940, the processor 910, and memory 950 and/or 920.

The handheld device may be configured to include a set of buttons or input signaling components with which a user may select from a set of available options. These could be considered input device #1 975 or input device #2 980. The handheld device may also be configured to include an output device 970 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 910, a data storage device 930, a bus 940, and memory 920, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 985.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 910. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the disclosed embodiments have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A dynamic code analysis tool comprising:
    a first extractor for extracting a set of software product configurations upon receipt of a software product;
    a second extractor for extracting a set of test suite configurations upon receipt of a test suite for the software product;
    a CCA engine for analyzing a set of commands within the set of test suite configurations to a set of commands within the set of software product configurations; and
    a report generator for communicating the relationship between the commands within the set of test suite configurations (test suite commands) to the commands within the set of software product configurations (software product commands).

2. The dynamic code analysis tool of claim 1, wherein the relationship between the test suite commands and the software product commands is a coverage of the software product commands by the test suite commands.

3. The dynamic code analysis tool of claim 2, wherein the report generator further associates the relationship between each of the test suite commands and each of associated software product commands with one or more tests within the test suite for the software product, wherein the relationship is informationally coupled to the one or more tests within the test suite for the software product.

4. The dynamic code analysis tool of claim 3, wherein the informational coupling is a hyperlink from the relationship for each of the test suite commands to the one or more tests using that command.

5. The dynamic code analysis tool of claim 1, the CCA engine further comprising:
    a software product interface for applying the test suite for the software product to the software product to produce a set of test suite results;
    a comparator for analyzing the relationship between the set of test suite results and a set of golden results upon receipt of the set of golden results.

6. The dynamic code analysis tool of claim 5, wherein relationship the comparator analyzes applies a first metric to each result in the test suite of results based on a value of a corresponding result in the golden set of results if a test associated with the result in the test suite of results is equivalent to a test associated with the result in the golden set of results.

7. The dynamic code analysis tool of claim 5, wherein relationship the comparator analyzes applies a second metric to each result in the test suite of results if a test associated with the result in the test suite of results has no equivalent to any test associated with the golden set of results.

8. A non-transitory, machine readable medium containing executable instructions which when executed by a data processing system cause the data processing system to process a method of reporting results of a software product validation, the method comprising:
    extracting a set of software product configurations upon receipt of a software product to be validated;
    extracting a set of test suite configurations upon receipt of a test suite for the software product;
    comparing a set of attributes within the set of test suite configurations to a set of attributes within the set of software product configurations;
    calculating a first metric for the first attribute based on associated attributes within the set of software product configurations; and
    storing the first metric for the first attribute in a non-volatile media, wherein the stored first metric provides a first indicator of a quality of the software product to be validated.

9. The non-transitory, machine readable medium of claim 8, wherein the first attribute is a command and option pair within the set of software product configurations.

10. The non-transitory, machine readable medium of claim 8, the method further comprising:
    comparing the set of attributes within the set of test suite configurations to a set of attributes within a second set of second test suite configurations;
    calculating a second metric for the first attribute based on associated attributes within the second set of second test suite configurations; and
    storing the second metric for the first attribute in a non-volatile media, wherein the stored second metric provides a second indicator of the quality of the software product to be validated.

11. The non-transitory, machine readable medium of claim 10, wherein the second attribute is a set of possible results of the second test suite from prior application to the software product.

12. The non-transitory, machine readable medium of claim 11, wherein the set of possible results include one or more of a software crash result, a return with errors result, and a successful completion result.

13. The non-transitory, machine readable medium of claim 10, wherein the second metric storage is informationally linked to the first metric storage.

14. The non-transitory, machine readable medium of claim 13, wherein the informational link is a color overlay.

15. The non-transitory, machine readable medium of claim 13, wherein the informational link is a hyperlink.

16. A dynamic code testing tool comprising:
   a first extractor configurable to extract a set of software product configurations upon receipt of a software product;
   a CCA engine configurable to generate combinations and permutations of the set of software product configurations; and
   a test suite generator configurable to extract commands and associated command options from the combinations and permutations of the set of software product configurations and allocate one or more commands and associated command options each to a test case within a test suite, wherein the test suite, when applied to the software product, generates a set of test suite results for the software product indicating the response of the software product to each of the test cases in the test suite.

17. The dynamic code testing tool of claim 16, wherein the test suite generator is further configurable to compare commands and associated command options within an existing set of test cases within an existing test suite to the commands and associated command options from the set of software product configurations, and allocate only commands and associated command options each to a test case within the test suite when the command and associated command option is without equivalent representation in the existing set of test cases within the existing test suite.

18. The dynamic code testing tool of claim 16, further comprising:
   a results analysis module configurable to analyze the results from an application of the set of test suite results to the software product and determine a result metric associated with each.

19. The dynamic code testing tool of claim 18, wherein the set of possible result metrics include one or more of a software crash result, a return with errors result, and a successful completion result.

20. The dynamic code testing tool of claim 18, wherein the one or more commands and associated command options are informationally linked each to the associated test case within the test suite.

* * * * *